Aug. 15, 1950     W. SCHAELCHLIN ET AL     2,519,293
ENGINE STARTING CONTROL SYSTEM AND SWITCH

Filed May 7, 1945     3 Sheets-Sheet 1

WITNESSES:

INVENTORS
Walter Schaelchlin
and Kurt Mahnke.
BY
Paul E. Friedemann
ATTORNEY

Aug. 15, 1950 W. SCHAELCHLIN ET AL 2,519,293
ENGINE STARTING CONTROL SYSTEM AND SWITCH
Filed May 7, 1945 3 Sheets-Sheet 2

WITNESSES:

INVENTORS
Walter Schaelchlin
and Kurt Mohnke.
BY
Paul E. Friedemann
ATTORNEY

INVENTORS
Walter Schaelchlin
and Kurt Mohnke

Patented Aug. 15, 1950

2,519,293

UNITED STATES PATENT OFFICE 2,519,293

ENGINE STARTING CONTROL SYSTEM AND SWITCH

Walter Schaelchlin and Kurt Mahnke, Forest Hills, Pa., assignors to Westinghouse Electric Corporation, East Pittsburgh, Pa., a corporation of Pennsylvania Application May 7, 1945, Serial No. 592,404

10 Claims. (Cl. 290—31)

1

Our invention relates to control apparatus for electric power plants in which a Diesel or other internal combustion engine drives an electric generator, and in which an electric starting motor or an auxiliary starting winding on the generator is provided for temporary excitation from a battery or other separate current source in order to start the internal combustion engine.

When starting a power plant of this type, the starting winding is temporarily series-connected with the generator armature to the separate current source until the engine starts firing. Thereafter, the separate source is disconnected and the main generator field winding is connected to the armature to be self-energized by the voltage or current generated by the armature. It is then necessary to prevent a reconnection between separate source and armature as long as the engine continues to run properly, because such connection, under generated armature voltage, is apt to cause damage to the plant.

It has, therefore, been customary to use an electromagnetic contactor for controlling the change from starting to running connections and to energize the coil of the contactor through the contact of a voltage relay which, in turn, is connected across the generator terminals so that the contactor cannot be energized and thereby placed into starting condition when the generator has developed sufficient voltage to pick up the voltage relay. Such an interlock between control contactor and separate voltage relay depends for proper operation on the working condition and maintenance of the separate interlocking relay and its contact devices and requires a relatively high pick-up current for this interlocking relay.

It is an object of our invention to provide a start control for combustion-engine generators which secures a higher degree of safety from changing the generator conections under improper conditions and provides a more directly acting interlock than obtainable in the above-mentioned start control apparatus of the type heretofor customary.

Another object of the invention is to devise start control means, for power plants as mentioned above, which provide an interlocking function without requiring a voltage relay separate from the main starting contactor; and still another object is to design the control means in such a manner as to avoid the undesirably high pick-up current required for the interlocking device of the known systems. It is also an object of the invention to render the start control means insensitive to impact, shock or vibration so that they are

2 suitable for use on board of ship or other locations where the occurrence of impact is to be expected.

According to our invention, we equip Diesel-electric or the like power plants with a start control switch which has associated main and auxiliary contacts, the former serving to connect the starting motor or starting winding to a battery or other separate current source, the latter contact serving to connect the main field winding of the generator to the generator armature, and both contacts being mechanically associated so that the auxiliary contact is open when the main contact is closed and closes only after the main contact has opened. The control switch is further provided with blocking means, such as a holding-out magnet, which are electrically connected to the auxiliary contact in order to prevent the switch from changing the generator from running to starting connection as long as the main field winding of the generator is energized by current of a given minimum magnitude.

According to another feature of the invention, the main contact and auxiliary contact are controlled by a cam shaft which is normally biased toward a position in which the contacts are set for running connection of the generator; and two electromagnets acting in opposite directions on the shaft are provided, one magnet being operator-controlled to permit turning the cam shaft temporarily into starting position, and the other serving to impose a blocking torque on the shaft which prevents the first magnet from repeating its performance after, and as long as, the main generator field is in generating condition.

According to still another feature of the invention, the main and auxiliary contacts and the cam assembly for controlling them are so designed that each contact is spring biased toward one of its two positions and, when in the other position, has a part engaged by a circular cam surface of the assembly which extends concentrically to the cam axis so that slight angular vibrations, as may occur due to shock, have no effect on the contact position, the cam assembly being approximately balanced in static and dynamic respects in order to maintain any such vibrations at a minimum.

There and other objects and features of our invention will be apparent from the drawings, in which.

Figure 2:
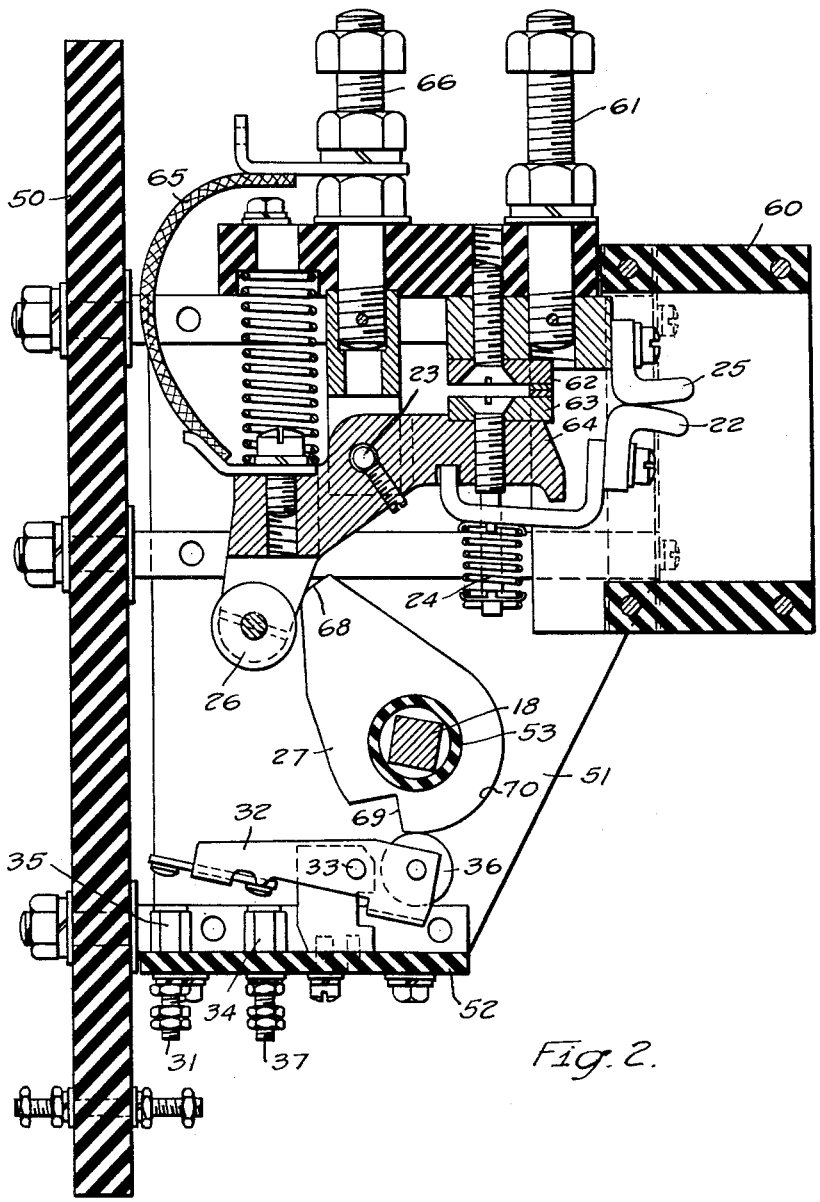
Fig. 2 is a vertical cross section through the same apparatus taken along the line II—II in Fig. 1.
Figure 3:
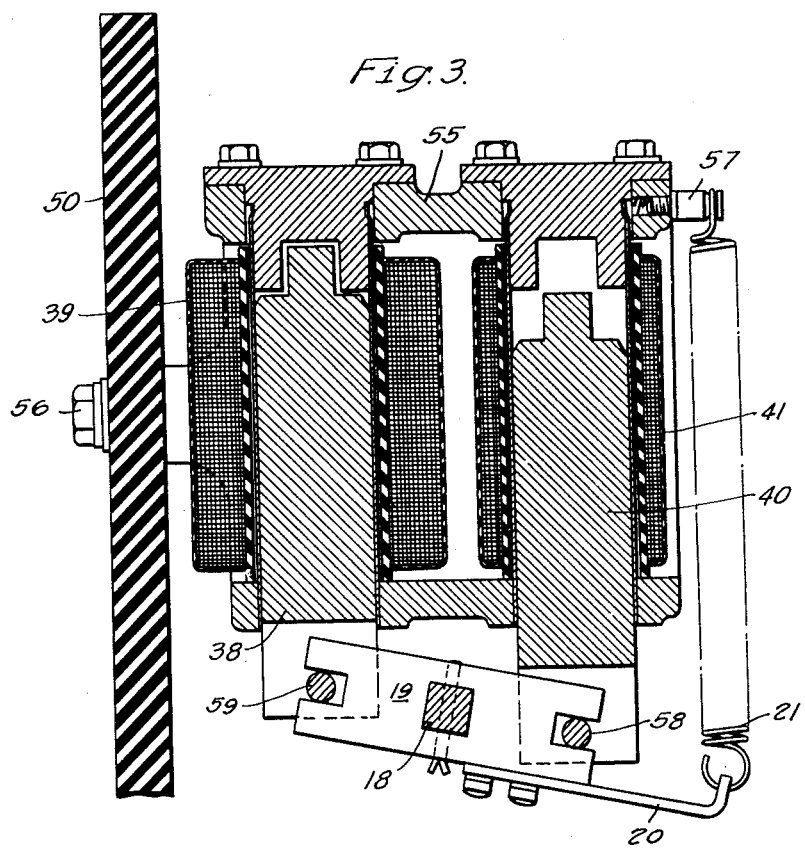
Figure 4:
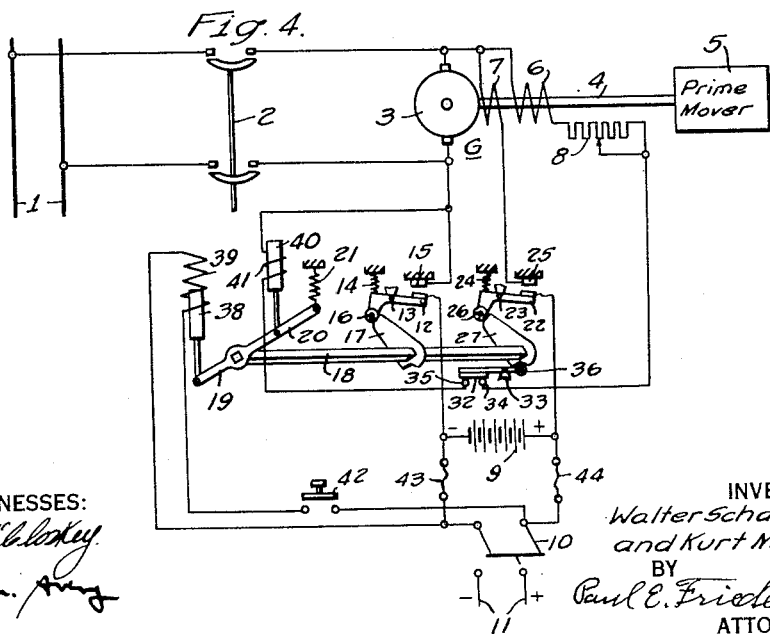

Fig. 3 another vertical cross section through the electromagnet assembly appertaining to the same apparatus, the section extending in a plane in parallel to the cross section of Fig. 2; and Fig. 4 is a diagrammatic showing of the same starting switch and of a start control system for a power plant controlled by the switch.

Referring to the drawings, and at first with particular reference to the diagram of Fig. 4, numeral 1 represents the buses of a power line to be energized through a switch or circuit breaker 2 by a generator G. The armature 3 of generator G is connected by a suitable transmission, here represented by a shaft 4, with a prime mover 5 consisting of a Diesel engine or other internal combustion engine. While during the operation of the power plant, the armature 3 is driven by the prime mover, the generator G is also designed as a starting motor for driving the prime mover when the engine is started. Therefore, the generator has a main field winding 6 to be energized during normal operation and a starting winding 7 which is energized only during the starting periods. The main field winding 6 is connected through an adjusting rheostat 8, and through the starting switch still to be described, with the armature terminals of the generator in order to be self-excited during the generating operation. The starting winding 7 is connected, also through the starting switch, with the terminals of a battery 9 which supplies the driving energy during the starting periods. A switch 10 serves to connect the battery with a direct-current line 11 when the battery is to be charged.

The starter switch has a main contact assembly designed for double pole interruption. One of the movable contacts of these main contact means is denoted by 12. It is pivoted at 13 and normally biased by a contact spring 14 toward engagement with the corresponding stationary contact 15. A follower roller 16 mounted on contact member 12 cooperates with a cam member 17 which in the position illustrated in Fig. 4, forces the follower and contact member 12 into the open position in opposition to the force of spring 14. The cam member 17 is secured to a cam shaft 18 which carries a double arm lever 19. An extension 20 of this lever is engaged by a spring 21 which tends to hold the cam shaft 18 in the illustrated position in which the contact 12 is in the open position.

The second contact member of the main contact means is denoted by 22. It is pivoted at 23 and biased by a contact spring 24 toward engagement with a stationary contact 25. A follower 26 also consisting of a roller is engaged by a cam member 27 secured to the cam shaft 18. The two contact units are of duplicate design and operate simultaneously to open or close the circuit connecting the battery 9 in series with the armature 3 and the starting winding 7.

The starter switch is further provided with an auxiliary or control contact 32 which is pivoted at 33 and cooperates with two stationary contacts 34 and 35. A spring (not shown) is provided in order to bias the contact 32 toward engagement with the contacts 34 and 35. A roller 36 mounted on the contact member 32 is engaged by the above-mentioned cam member 27 and is forced in opposition to the contact spring to close the auxiliary contact when the cam shaft is in the position represented in Fig. 4.

An electromagnet of the solenoid type has its movable core 38 linked to the actuating lever 19 of shaft 18. When the coil 39 of this magnet is energized, it tends to lift the core 38 and to rotate the shaft 18 and its cam member 17 and 27 into a position where the main movable contacts 12 and 22 are closed by the action of their respective springs 14 and 24, while the auxiliary contact 32 is forced to open.

Another electromagnet serving as a blocking or hold-out magnet and being preferably also of the solenoid type has its movable core 40 linked to the lever 19 at the side opposite to that of core 38. Hence when the coil 41 of the blocking magnet is energized, it adds to the torque imposed on the shaft 18 by the spring 21 and thereby prevents the rotation of shaft 18 even if coil 39 of the actuating magnet is energized. It is, of course, understood that the two magnets are properly rated with respect to each other in order to obtain the just-mentioned blocking effect. Coil 41 is series connected with the main field winding 6 across the armature terminals of generator G and through the auxiliary contact 32. Consequently, the blocking effect obtains only after the power plant has been started and as long as the main field winding 6 of the generator G remains sufficiently energized.

The coil 39 of the actuating magnet is connected across the battery 9 through a start contact, for instance, of the push-button type. Numerals 43 and 44 designate two fuses or the like protecting devices.

If the power plant is at rest, the engine 5 can be started by temporarily depressing the contact 42. The coil 39 is then energized and, since no voltage is generated by the armature 3 at this time, the coil 41 is deenergized so that the armature 38 is lifted thereby rotating the shaft 18 with its cam members 17 and 27. As a result, the auxiliary contact 32 is open and the main contacts 12 and 22 are closed. The battery 9 is now connected through contacts 12 and 22 with the series arrangement of armature 3 and starting winding 7 so that the generator G operates as a motor and starts the engine 5. When the contact 42 is thereafter released thus deenergizing the coil 39, the shaft and cam members are returned into the illustrated position (Fig. 4) due to the action of the spring 21. As a result, the main contacts are opened while the auxiliary contact 32 is returned to the closed position. Assuming that the prime mover has properly started, the armature 3 will now generate a voltage which energizes the main field winding 6 as well as the coil 41 of the blocking magnet. Consequently, when thereafter the contact 42 is actuated, the renewed energization of coil 39 produces a torque on shaft 18 which is too weak to overcome the combined torque imposed on the shaft by the spring 21 and the blocking magnet. In this manner, the power plant is safely prevented from being damaged by an improper switching from running to starting conditions.

It will be understood from the foregoing that the interlocking effect achieved in the apparatus acts as directly as possible and avoids the use of a separate relay and the disadvantages and possible sources of failure associated therewith. It may be desired, for reasons of uniformity of holding coils for use with generators having different field currents, to use shunt connected holding coil circuit. In this case it will be advisable to connect in series with the holding coil a current-indicating device, such as a small annunciator relay or a light. In addition to the described schemes, a voltage relay preventing closing of coil 39 when voltage is produced at the generator terminals may be used as in former starting devices. Since the blocking magnet is energized by the generator field current, the protective performance is of high safety because the generation of generator voltage depends absolutely on the presence of energizing current in the main field winding. An interruption in the coil circuit of the blocking magnet will prevent the generator from becoming energized so that the plant cannot be operated with a defective hold-out coil.

Figure 1:
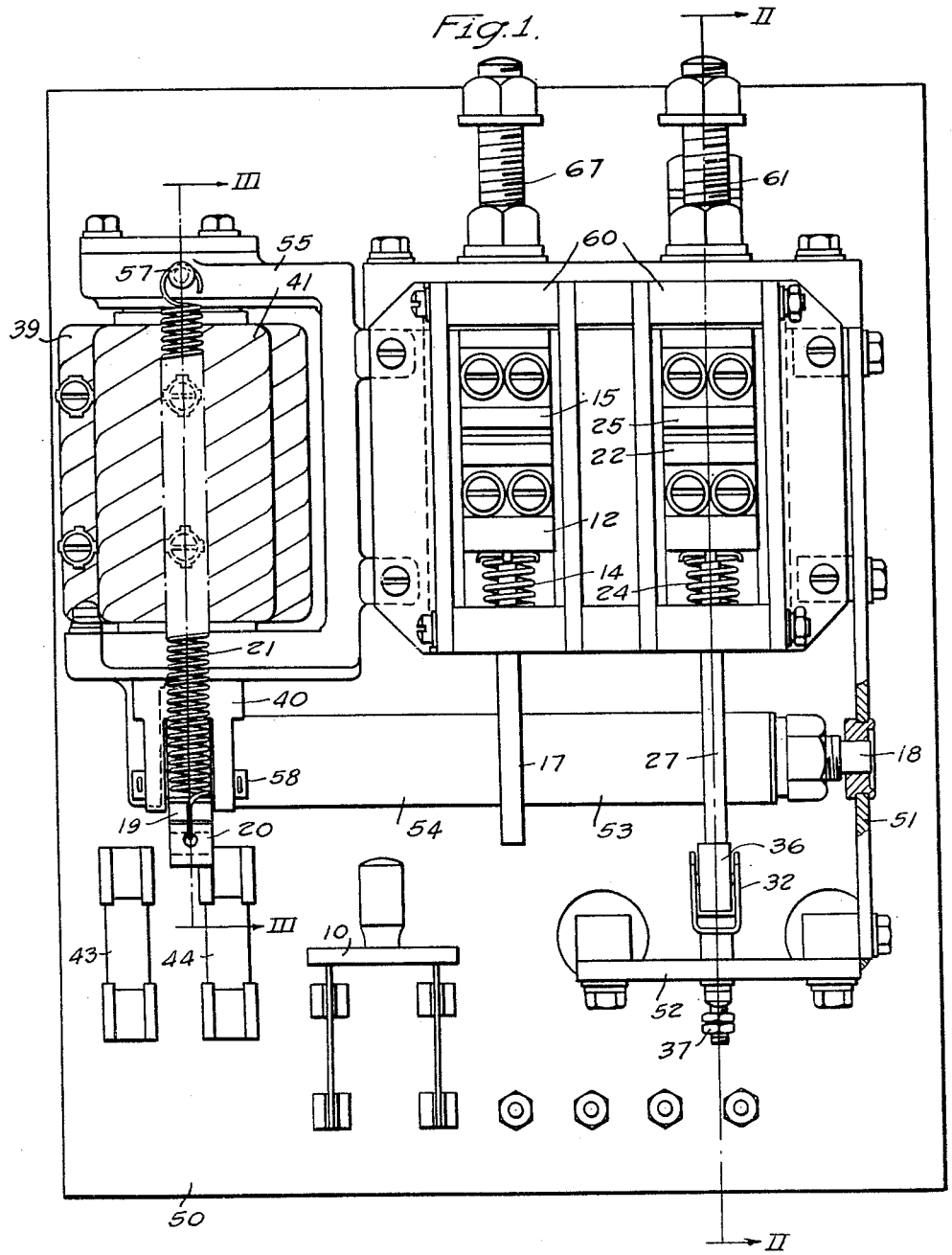
Figure 1 represents a front view of a starting switch according to the invention.

The embodiment of a starter switch exemplified by Figs. 1, 2 and 3, incorporates the principles described in the foregoing with reference to Fig. 4. Therefore, the reference numerals of Fig. 4 are also applied to Figs. 1, 2 and 3 wherever identical or functionally similar parts are involved.

According to Figs. 1 to 3, all essential elements of the starter switch, with the optional exception of the start contact 42, are mounted on a common base plate 50 so that they can be enclosed by means of a single enclosure (not shown). Attached to the base plate is a mounting structure 51 which has a cross plate 52. The parts of the auxiliary contact including the movable contact 32, its pivot 33 and the appertaining stationary contacts 35 and 34 are mounted on the cross plate 52 which carries also the terminals 31 and 37 for connecting the auxiliary contact into the circuit of the generator main field winding.

The cam shaft 18 is journalled in the mounting structure 51 and is provided with spacing sleeves 53 and 54. The cam structure 55 of the two solenoid magnets is secured to the base plate 50 by means of a fastening bolt 56 (Fig. 3). A pin 57 attached to the frame 55 serves as an abutment for the biasing spring 21 of the cam shaft.

The biasing spring 21 is attached to the extension 20 of the actuating lever 19 (Fig. 3). The core 40 of the blocking or hold-out magnet has a cross pin 58 which engages a recess of lever 19. The core 38 of the actuating magnet has a similar pin 59 in engagement with a diametrically opposite recess of the lever.

Attached to the mounting structure is further an arc box structure 60 (Figs. 1 and 2). The main contacts 12, 15 and 22, 25 are located in the arcing chambers of the structure 60. Each of the two main contact devices is designed as illustrated in Fig. 2 with reference to the contacts 22 and 25. These two contacts are designed as arcing contacts and may have horn-shaped configuration. Contact 25 is rigidly secured to a terminal bolt 61 and is provided with a contact member 62 which cooperates with a similar but movable contact member 63 in order to relieve the arcing contacts 22 and 25 of the continuous current load. Contact members 63 as well as the arcing contact 22 are secured to a movable part 64 which is rotatable about the pivot 23 of the whole movable assembly and carries the above-mentioned follower 26. A flexible cable 65 connects the movable contact assembly with an insulated terminal bolt 66. The terminal bolt 67 visible in Fig. 1 corresponds to the bolt 66 but belongs to the movable contact assembly of the other main contact.

The cam surface of the two cam members 17 and 27 is shaped so that the surface portion 68 which engages the follower of the main contact is circular and extends concentrically with respect to the axis of shaft 18. The surface portion of the cam member, which is adjacent to the groove 69 and engages the roller 36 of the auxiliary contact device when the latter is in closed position, is also circular and concentric to the shaft axis. The cam shaft and the actuating lever 19 are preferably designed so that the whole revolvable assembly is balanced in static and dynamic respects about the axis of shaft 18. Consequently, the revolvable assembly has little or no tendency to perform uncontrolled movements when the base plate 50 or the support on which it is mounted, is subject to vibration or impact shock. However, any remaining tendency to vibrate under shock conditions does not cause the cam shaft assembly to move the main contacts or the auxiliary contact out of their proper position because of the concentric design of the above-mentioned surface portions of the two cam members 17 and 27. That is, when the starter switch is in the position represented in Fig. 4, the occurrence of slight angular vibrations of the cams will not impart an angular motion to the movable contacts 12 and 22, while the movable auxiliary contact 32 is forced to stay closed due to the action of its biasing spring. When the switch is in the position represented in Fig. 2, the main movable contacts are subjected to the force of their biasing springs and hence are prevented from opening under shock while any angular vibration of the cam shaft has no effect on the movable auxiliary contact 32 because such vibration produces no motion of the roller 36 about the pivot 33.

According to Fig. 1, the charging switch 10 and the fuses 43 and 44 are also mounted on the base plate 50. If desired, this base plate may also carry the control contact 42 (see Fig. 1) or this contact may be located at a remote point more convenient to the operator.

Starting systems and switches according to the invention, in addition to the advantages mentioned in the foregoing, avoid the necessity of providing a high pick-up current required for the separate relays and appertaining interlocking device heretofore customary. Since in the starter switch described in the foregoing, the magnetic circuit of the blocking or hold-out magnet is normally virtually closed, a very low current is needed to make the magnet effective.

It will be understood by those skilled in the art that apparatus according to the invention can be modified in various ways, other than shown, without departing from the principles and essential features of the invention as set forth in the claims attached hereto.

We claim as our invention:

1. In an electric power plant comprising an internal combustion engine and a generator which has an armature coupled with said engine and a main field winding for generator operation and a starting field winding for operation as a starting motor, the combination of a contact device having movable main contact means, movable auxiliary contact means and biasing means tending to hold said main contact means in open position and said auxiliary contact means in closed position, said main contact means being connected with said armature and said starting winding for connecting, when closed, said armature and said starting winding to a separate current source, said auxiliary contact means being connected with said armature and said main winding for causing, when closed, said main winding to be self-excited, start control means for moving, when actuated, said main contact means into closed position and said auxiliary contact means into open position in opposition to said biasing means, and blocking means electrically connected with said main winding and associated with said contact device so as to prevent said start control means from moving said main and auxiliary contact means when said main winding is sufficiently excited.

2. In an electric power plant comprising an internal combustion engine and a generator which has an armature coupled with said engine and a main field winding for generator operation and a starting field winding for operation as a starting motor, the combination of a contact device having movable main contact means, movable auxiliary contact means and biasing means tending to hold said main contact means and said auxiliary contact means in given respective positions, said main contact means being connected with said armature and said starting winding for connecting said armature and said starting winding to a separate current source when actuated, said auxiliary contact means being connected with said armature and said main winding for causing said main winding to be self-excited when actuated, operator-controllable starting means forming part of said device for actuating said main contact means and said auxiliary contact means in opposition to said biasing means, and blocking means electrically connected with said main winding and associated with said contact device so as to prevent said start control means from actuating said main and auxiliary contact means when said main winding is sufficiently excited.

3. In an electric power plant comprising an internal combustion engine and a generator which has an armature coupled with said engine and a main field winding for generator operation and a starting field winding for operation as a starting motor, the combination of a contact device having movable main contact means, movable auxiliary contact means and biasing means tending to hold said main contact means in open position and said auxiliary contact means in closed position, said main contact means being connected with said armature and said starting winding for connecting, when closed, said armature and said starting winding to a separate current source, said auxiliary contact means being connected with said armature and said main winding for causing, when closed, said main winding to be self-excited, electromagnetic start control means forming part of said device for moving when actuated, said main contact means into closed position and said auxiliary contact means into open position in opposition to said biasing means, operator-controllable contact means for energizing said start control means, and electromagnetic blocking means electrically connected with said main winding and mechanically associated with said contact device so as to prevent said start control means from moving said main and auxiliary contact means when said main winding is excited.

4. In an electric power plant comprising an internal combustion engine, a generator having an armature coupled with the engine and having a field winding, and means for starting the engine, the combination of a contact device having movable main contact means, movable auxiliary contact means and biasing means tending to hold said main contact means in open position and said auxiliary contact means in closed position, said main contact means being connected with said starting means for connecting it to a separate current source, said auxiliary contact means being connected with said winding for causing it to be excited when said auxiliary contact is closed, start control means for moving, when actuated, said main contact means into closed position and said auxiliary contact means into open position in opposition to said biasing means, and blocking means electrically connected with said main winding and associated with said contact device so as to prevent said start control means from moving said main and auxiliary contact means when said winding is excited.

5. A starting switch for combustion-engine generators, comprising a heavy-duty main contact and an auxiliary contact, an assembly disposed for controlling said two contacts and being movable between two positions and biased toward one of them so as to normally cause said main contact to open and said auxiliary contact to close, electromagnetic start control means having a movable member connected with said assembly for moving, when operative, said assembly in opposition to its bias in order to then close said main contact and open said auxiliary contact, and electromagnetic blocking means electrically connected with said auxiliary contact and having a movable member mechanically associated with said assembly for preventing said start control means from moving said assembly when said blocking means are energized by sufficient voltage applied thereto under control by said auxiliary contact.

6. A starting switch for combustion-engine generators, comprising a main contact and an auxiliary contact, an assembly disposed for controlling said two contacts and being rotatable between two positions and biased toward one of them so as to normally cause said main contact to open and said auxiliary contact to close, electromagnetic start control means having a movable member connected with said assembly for moving, when operative, said assembly in opposition to its bias in order to then close said main contact and open said auxiliary contact, and electromagnetic blocking means electrically series-connected with said auxiliary contact and having a movable member connected to said assembly for imposing, when energized, a blocking bias to said assembly in the direction of the assembly bias in order to thereby prevent said start control means from moving said assembly when sufficient voltage is applied to said blocking means through said closed auxiliary contact.

7. A starting switch for combustion-engine generators, comprising a base structure, a main contact mounted on said structure for motion between open and closed positions and biased toward one of said positions, an auxiliary contact mounted on said structure for motion between open and closed positions and biased toward one of said latter positions, an assembly revolvably mounted on said structure for motion between two angular position, a spring for biasing said assembly toward one of said angular positions, said assembly including cam means, said main contact and said auxiliary contact having respective parts held in engagement with said cam means under the bias of said respective contacts so that said main contact is open and said auxiliary contact closed when said assembly is in said one angular position while said main contact is open and said auxiliary contact closed when said assembly is in the other angular position, the cam portions that are in engagement with said part of said main contact when said main contact is open being of circular shape and concentric to the axis of revolution of said assembly in order to prevent said main contact from closing due to slight movements of said assembly caused by shock, operator-actuable start control means for revolving said assembly in opposition to its bias into said other angular position, and blocking means associated with said assembly and connected to said auxiliary contact for preventing said start control means from revolving said assembly when sufficient voltage is applied to said blocking means under control by said auxiliary contact.

8. A starting switch for combustion-engine generators, comprising a main contact and a control contact, an assembly mechanically coupled with said two contacts and movable between two positions and biased toward one of them so as to normally open said main contact while closing said control contact, electromagnetic start control means having a movable member connected with said assembly for moving, when operative, said assembly in opposition to its bias in order to then close said main contact and open said control contact, and electromagnetic blocking means having a magnet coil electrically connected with said control contact so as to be energizable only when said control contact is closed, said blocking means having a movable member mechanically associated with said assembly for preventing said start control means from moving said assembly when said coil is sufficiently energized.

9. A starting switch for combustion-engine generators, comprising a base structure, main contact means mounted on said structure and having a first movable contact with respective open and closed positions biased toward said closed position, control contact means mounted on said structure and having a second movable contact with respective open and closed positions biased toward said closed position, a shaft revolvably mounted on said structure and having two angular shaft positions, said shaft having cam means in controlling connection with said two contacts, a spring in connection with said shaft for biasing it toward one of its positions in which said cam means cause said first contact to open and permit said second contact to close, a solenoid having a movable core member linked to said shaft in order to revolve, when energized, said shaft into the other position so as to then permit said first contact to close and cause said control contact to open, means connected to said solenoid for temporarily energizing it, and another solenoid electrically connected with said control contact means and having a movable core member linked to said shaft to hold said shaft in opposition to said first solenoid so as to prevent said first solenoid from revolving said shaft when sufficient voltage is applied to said other solenoid under control by said control contact means.

10. A starting switch for combustion-engine generators, comprising a base structure, heavy-duty main contact means mounted on said structure and having a first movable contact with respective open and closed positions biased toward closed position, control contact means mounted on said structure and having a second movable contact with respective open and closed positions biased toward closed position, a shaft revolvably mounted on said structure and having two angular shaft positions, said shaft having cam means in controlling connection with said first contact and said second contact, a spring in connection with said shaft for biasing said shaft toward one of its positions in which said cam means cause said first contact to open and permit said second contact to close, a double-arm crank member secured to said shaft, a solenoid having a movable core member linked to one arm of said crank member for imposing, when energized, a torque on said shaft in the direction toward the other shaft position in order to permit said second contact to open and cause said first contact to close, circuit means connected to said solenoid for temporarily energizing it, and another solenoid electrically connected with said control contact means and having a movable core member linked to the other arm of said crank member to prevent said shaft in opposition to said first solenoid from revolving said shaft in response to voltage applied to said other solenoid through said control contact means.

WALTER SCHAELCHLIN.
KURT MAHNKE.

REFERENCES CITED

The following references are of record in the file of this patent:

UNITED STATES PATENTS

| Number | Name | Date |
| --- | --- | --- |
| 733,564 | Sundh | July 14, 1903 |
| 1,075,452 | Weichsel et al. | Oct. 14, 1913 |
| 1,084,079 | Fynn | Jan. 13, 1914 |
| 1,247,649 | Doman | Nov. 27, 1917 |
| 1,281,827 | Phillips | Oct. 15, 1918 |
| 1,487,693 | Brockway | Mar. 18, 1924 |
| 1,757,486 | Slagle | May 6, 1930 |
| 1,964,467 | Hunter et al. | June 26, 1934 |
| 1,993,633 | Tjoflat | Mar. 5, 1935 |
| 2,086,197 | Warner | July 6, 1937 |
| 2,293,968 | Chandler et al. | Aug. 25, 1942 |